US010443353B2

(12) United States Patent
McDaniel et al.

(10) Patent No.: US 10,443,353 B2
(45) Date of Patent: Oct. 15, 2019

(54) TREATMENT OF SILICEOUS MATERIALS USING CATECHOL AND AMINES IN SUBTERRANEAN APPLICATIONS

(71) Applicant: Halliburton Energy Services, Inc., Houston, TX (US)

(72) Inventors: Cato Russell McDaniel, The Woodlands, TX (US); Dale E. Jamison, Humble, TX (US)

(73) Assignee: Halliburton Energy Services, Inc., Houston, TX (US)

(*) Notice: Subject to any disclaimer, the term of this patent is extended or adjusted under 35 U.S.C. 154(b) by 340 days.

(21) Appl. No.: 15/033,931

(22) PCT Filed: Dec. 6, 2013

(86) PCT No.: PCT/US2013/073528
§ 371 (c)(1),
(2) Date: May 3, 2016

(87) PCT Pub. No.: WO2015/084391
PCT Pub. Date: Jun. 11, 2015

(65) Prior Publication Data
US 2016/0272878 A1 Sep. 22, 2016

(51) Int. Cl.
*E21B 37/00* (2006.01)
*E21B 43/25* (2006.01)
(Continued)

(52) U.S. Cl.
CPC .............. *E21B 37/00* (2013.01); *C09K 8/035* (2013.01); *C09K 8/528* (2013.01); *C09K 8/74* (2013.01); *C09K 8/56* (2013.01); *C09K 8/62* (2013.01); *E21B 21/003* (2013.01); *E21B 43/25* (2013.01); *E21B 43/26* (2013.01)

(58) Field of Classification Search
None
See application file for complete search history.

(56) References Cited

U.S. PATENT DOCUMENTS 4,081,030 A 3/1978 Carpenter et al.
4,525,562 A 6/1985 Patel
(Continued)

OTHER PUBLICATIONS

International Search Report and Written Opinion issued in related PCT Application No. PCT/US2013/073528 dated Sep. 1, 2014, 10 pages.
(Continued)

*Primary Examiner* — Anuradha Ahuja
(74) *Attorney, Agent, or Firm* — Tenley Krueger; Baker Botts L.L.P.

(57) ABSTRACT

Compositions and methods for the treatment of siliceous materials (e.g., silica and/or other silicates) in subterranean applications. Certain of those methods herein include providing a treatment composition comprising a base fluid, a catechol component, and an amine component; introducing the treatment composition into at least a portion of a subterranean formation comprising one or more siliceous materials; and allowing at least a portion of the treatment composition to contact at least a portion of the siliceous materials in the subterranean formation to dissolve at least a portion of the siliceous materials.

17 Claims, 2 Drawing Sheets

(51) Int. Cl.
*C09K 8/74* (2006.01)
*E21B 43/26* (2006.01)
*C09K 8/035* (2006.01)
*C09K 8/528* (2006.01)
*C09K 8/56* (2006.01)
*C09K 8/62* (2006.01)
*E21B 21/00* (2006.01)

(56) References Cited

U.S. PATENT DOCUMENTS

| | | | | |
|---|---|---|---|---|
| 7,712,536 | B2 * | 5/2010 | Pirolli | C09K 8/72 166/312 |
| 2009/0233819 | A1 * | 9/2009 | Fuller | C09K 8/74 507/224 |
| 2010/0059226 | A1 * | 3/2010 | Termine | C09K 8/66 166/308.1 |
| 2011/0079392 | A1 * | 4/2011 | Reyes | C09K 8/528 166/310 |
| 2012/0145401 | A1 * | 6/2012 | Reyes | C09K 8/528 166/305.1 |
| 2013/0130947 | A1 | 5/2013 | Brannon et al. | |
| 2013/0157905 | A1 | 6/2013 | Saini et al. | |
| 2013/0269936 | A1 * | 10/2013 | Reyes | C09K 8/74 166/279 |

OTHER PUBLICATIONS

Barnum, Dennis W. "Reaction of catechol with colloidal silica and silicic acid in aqueous ammonia." Inorganic Chemistry 11.6 (1972): 1424-1429.
Jørgensen, S. Storgaard. "Dissolution kinetics of silicate minerals in aqueous catechol solutions." Journal of Soil Science 27.2 (1976): 183-195.
Iler, Ralph K. "The chemistry of silica." (1979): 83.
International Preliminary Report on Patentability issued in related Application No. PCT/US2013/073528, dated Jun. 16, 2016 (7 pages).

* cited by examiner (A)

(B)

TREATMENT OF SILICEOUS MATERIALS USING CATECHOL AND AMINES IN SUBTERRANEAN APPLICATIONS

CROSS-REFERENCE TO RELATED APPLICATIONS

The present application is a U.S. National Stage Application of International Application No. PCT/US2013/073528 filed Dec. 6, 2013, which is incorporated herein by reference in its entirety for all purposes.

BACKGROUND

The present disclosure relates to compositions and methods for treating subterranean formations, and more specifically, for the treatment of siliceous materials (e.g., silica and/or other silicates) in subterranean applications.

Drilling and servicing fluids may be used to produce hydrocarbon formations penetrated by well bores. The drilling fluids may be utilized when well bores are drilled into producing or injecting formations to minimize damage to the permeability of the formations and their ability to produce hydrocarbons and or accept injected fluids or gas. Servicing fluids may be utilized when completion operations are conducted in formations and when conducting work-over operations in the formations. The drilling and servicing fluids may deposit filter cake on the walls of the well bore within a formation, which may prevent the drilling and servicing fluids from being lost into the formation and may prevent solids from entering the porosities of the formation. Since the filter cake often reduces the permeability of a formation and obstructs the flow of fluid, the filter cake may be removed prior to placing the formation on production or injection. The removal of the filter cake may be accomplished by including an acid soluble bridging agent in the drilling or servicing fluid for bridging over the formation pores. The filter cake formed by the drilling or servicing fluid, which may include the bridging agent and a polymeric suspending agent, may be contacted with a strongly acidic solution, and the acidic solution may be allowed to remain in contact with the filter cake for a period of time sufficient to degrade the filter cake.

Hydrocarbon-bearing portions of subterranean formations penetrated by well bores also may be treated to stimulate the production of hydrocarbons therefrom. One such treatment, generally referred to as "acidizing," involves the introduction of an aqueous acid solution into a subterranean formation under pressure so that the acid solution flows through the pore spaces of the formation. The acid reacts with and/or dissolves acid soluble materials contained in the formation thereby increasing the size of the pore spaces, thus increasing the porosity and/or permeability of the formation. Another production stimulation treatment known as "fracture-acidizing" comprises injecting a treatment fluid comprising an acid into the formation at a pressure sufficient to create or enhance one or more fractures within the subterranean formation. The acid treatment fluid may leave one or more voids within the formation in addition to the one or more fractures enhanced within the formation. Another method of acidizing, known as "matrix acidizing," comprises injecting the treatment fluid into the formation at a pressure below that which would create or enhance one or more fractures within the subterranean formation. This acidizing method may likewise leave one or more voids within the formation.

Filter cakes and formations to be acidized (e.g., sandstone formations) often comprise some amount of silica or silicates, including but not limited to silica gels, colloidal silica, feldspars, and/or quartz. In order to remove filter cakes and/or to effectively acidize formations containing these species, the silica and/or silicates must be at least partially dissolved. Conventional techniques often involve using fluorides such as hydrofluoric acid (HF) or acid salts (e.g., ammonium bifluoride) to dissolve such silica or silicates. However, these fluorides may have undesirable environmental and/or toxicity problems, and as such may be impractical to use or prohibited altogether in certain circumstances and/or jurisdictions. Hydrofluoric acid and other fluorides also may pose undesirable health and/or safety risks to personnel working at a site where they are used. Moreover, strongly acidic solutions of HF may corrode metallic surfaces and completion equipment (e.g., sand screens), leading to their early failure.

BRIEF DESCRIPTION OF THE FIGURES

These drawings illustrate certain aspects of some of the embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for treating subterranean formations, and more specifically, for the treatment of siliceous materials (e.g., silica and/or other silicates) in subterranean applications.

Figure 2:
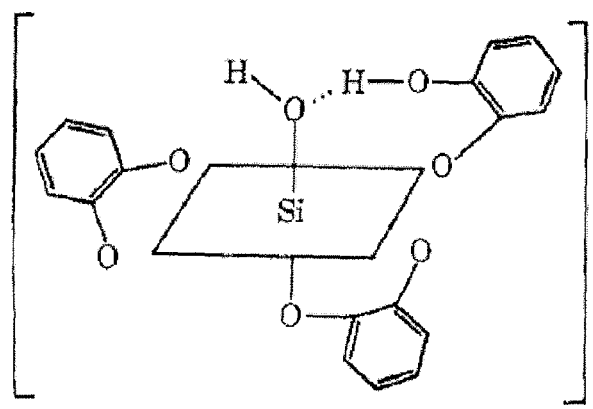
FIG. 2 is a diagram illustrating two structures of silicon coordination complexes that may be formed according to certain embodiments of the present disclosure.
Figure 2:
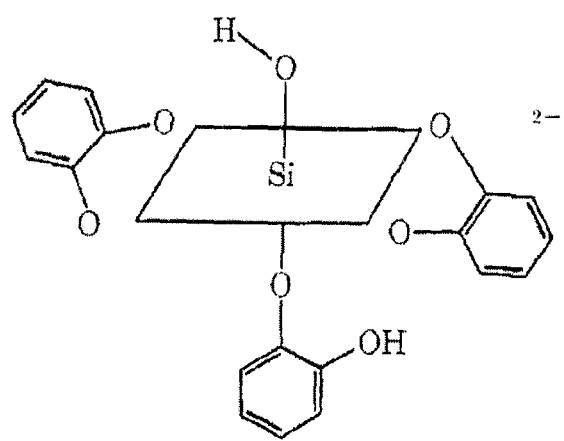

More specifically, the present disclosure provides compositions and methods that may be used to dissolve (either partially or entirely) and/or remove silica and/or silicates found in subterranean formations. Materials comprising silica and/or one or more silicates are hereinafter referred to as "siliceous materials". The compositions of the present disclosure generally comprise a base fluid and a mixture of (1) a catechol component, and (2) an amine component. The catechol component used in the methods and compositions of the present disclosure may comprise catechol or any compound having one or more pendent catechol groups. Siliceous materials (e.g., in a subterranean formation) may be contacted by a composition of the present disclosure for some period of time so as to at least partially dissolve or displace the siliceous materials from their location. In certain embodiments, the dissolved and/or displaced siliceous materials may be circulated out of the formation, for example, via a well bore penetrating a portion of the formation. Without limiting the mechanism by which the methods and compositions of the present disclosure perform, it is believed that the catechol component may "chelate" silicon atoms under basic conditions, thereby rendering the siliceous materials more soluble in an aqueous fluid. In certain embodiments, the silicon may form coordination complexes with catechol and ammonia, for example, according to Structure A and or Structure B shown in FIG. 2. However, these structures are provided merely as examples, and products and/or intermediates having other structures may be formed within the scope of the present disclosure that include silica and portions of the catechol component and/or the amine component.

The methods and compositions of the present disclosure may, among other benefits, provide a means of dissolving and/or removing siliceous materials from subterranean formations with less environmental, safety, toxicity, and/or other risks as compared to conventional methods. In certain embodiments, the methods and compositions of the present disclosure may enable the dissolution and/or removal of siliceous materials from a formation with a lesser amount of fluorides such as hydrofluoric acid and/or acid fluoride salts, or without a substantial amount of those compounds. In certain embodiments, the methods and compositions of the present disclosure also may enable more complete or efficient removal of filter cakes deposited in subterranean formations (e.g., during a drilling operation). In certain embodiments, the methods and compositions of the present disclosure also may enable more effective stimulation of certain subterranean formations, among other reasons, to improve porosity and/or permeability of a certain area of the formation. The methods and compositions of the present disclosure also may enable the dissolution and/or removal of siliceous materials in basic conditions, which may be less damaging and/or corrosive to a subterranean formation and/or equipment as compared to the acidic conditions used in convention methods.

The catechol component used in the compositions and methods of the present disclosure generally comprises any compound having a catechol functional group, i.e., a benzene ring with two hydroxyl functional groups bonded to adjacent carbon atoms on the benzene ring. Without limiting the mechanism by which the methods and compositions of the present disclosure perform, it is believed that the planar orientation of the adjacent hydroxyl functional groups and/or the vicinal phenolic hydrogen atoms may allow the molecules of the catechol component to chelate silicon atoms as bidentate ligands. Examples of catechol components that may be suitable for use in certain embodiments of the present disclosure may include, but are not limited to, catechol ($C_6H_6O_2$), catechin ($C_{15}H_{14}O_6$), hydroxyquinol (benzene-1,2,4-triol), pyrogallol (benzene-1,2,3-triol), 1,2,3,5-tetrahydroxybenzene, benzenehexol, catecholamines (e.g., epinephrine, norepinephrine, dopamine), humic acid, any derivative thereof, and/or any combination thereof. The catechol component may be used in any amount sufficient to chelate the amount(s) of silica and/or silicates in the area of a formation to be treated. In certain embodiments, the catechol component may be used in an amount such that the molar ratio of the amount of catechol component to the amount of silicon in the formation is from about 2:1 to about 10:1. In certain embodiments, the catechol component may be used in an amount such that the molar ratio of the amount of catechol component to the amount of silicon in the formation is about 3:1. A person of skill in the art, with the benefit of this disclosure, will recognize appropriate amount(s) of the catechol component to use in a particular embodiment of the present disclosure.

The amine component used in the compositions and methods of the present disclosure generally comprises ammonia and/or any amine known in the art. Without limiting the mechanism by which the methods and compositions of the present disclosure perform, it is believed that the amine component acts as a base to increase the pH where the siliceous materials are located and "attacks" the silicon atoms, thereby allowing the catechol component to chelate the silicon atoms. In certain embodiments, the amine component may perform one or more other functions in the subterranean formation, for example, as a clay stabilizer. The amine component may comprise one or more primary amines, secondary amines, tertiary amines, and/or polyamines. Examples of amine components that may be suitable for use in certain embodiments of the present disclosure may include, but are not limited to, ammonia (including ammonium salts and/or solutions), alkyl amines, amine hydroxides (hydroxylamines), ethylene diamine, ethanolamine, guanidine, any derivative thereof, and/or any combination thereof. The amine component may be used in any amount sufficient to increase the pH to the desired level. In certain embodiments, the amine component may be used in an amount such that the molar ratio of the amount of amine component to the amount of the catechol component is from about 3:1 to about 15:1. In certain embodiments, higher amounts of amine component may increase the rate of dissolution of the siliceous materials. A person of skill in the art, with the benefit of this disclosure, will recognize appropriate amount(s) of the amine component(s) to use in a particular embodiment of the present disclosure.

The rate of the dissolution of siliceous materials using an embodiment of the present disclosure may vary, for example, from several minutes to several weeks. The rate in a particular embodiment may depend on a number of factors, including but not limited to the temperature conditions, pH conditions, pressure conditions, and the types, amounts, and concentrations of amine component and catechol component used, as well as other factors that a person of skill in the art will recognize with the benefit of this disclosure. A person of skill in the art with the benefit of this disclosure also will be able to select the types and amounts of amine components and catechol components to dissolve siliceous materials at the desired rates in a particular application of the methods or compositions of the present disclosure.

The base fluid used in the methods and compositions of the present disclosure may comprise any fluid known in the art. Suitable aqueous fluids may comprise water from any source, provided that it does not contain compounds that adversely affect other components of the fluid. Such aqueous fluids may comprise fresh water, salt water (e.g., water containing one or more salts dissolved therein), brine (e.g., saturated salt water), seawater, or any combination thereof. In certain embodiments, the base fluid may comprise alcohols, such as ethylene glycol, glycerol, or aliphatic alcohols such as lauryl alcohol. In certain embodiments, the base fluid may comprise one or more organic liquids, including but not limited to esters, olefins, and the like. In certain embodiments, the base fluid may comprise emulsions (including invert emulsions), suspensions, gels, foams, or other mixtures of liquids with solids and/or gases. In those embodiments where the base fluid comprises an emulsion, the catechol component and the amine would be present in the aqueous phase of the emulsion.

The compositions of the present disclosure optionally may comprise any number of additional additives in combination with the catechol component and amine component. For example, the compositions of the present disclosure also may comprise one or more reducing sugars or salts thereof (e.g., gluconate salts), among other reasons, to assist in removing and/or dissolving calcium components of a filter cake and/or a subterranean formation. Other examples of such additional additives include, but are not limited to, salts, surfactants, acids, fluorides, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, filter cake removal agents, and the like. A person skilled in the art, with the benefit of this disclosure, will recognize the types of additives that may be included in the fluids of the present disclosure for a particular application.

The methods and compositions of the present disclosure may be used during or in conjunction with any subterranean operation. For example, the methods and/or compositions of the present disclosure may be used in the course of and/or after drilling operations in which a well bore has been drilled to penetrate a subterranean formation. In these embodiments, a composition of the present disclosure may be circulated in the well bore after drilling to contact a filter cake deposited on the walls of the well bore by the drilling fluid, among other purposes, to dissolve and/or remove one or more portions of the filter cake that comprise siliceous materials. In certain embodiments, this may be accomplished using the pumping system and equipment used to circulate the drilling fluid in the well bore during the drilling operation, which is described below.

In another example, the methods and/or compositions of the present disclosure may be used in the course of a stimulation treatment. In these embodiments, a composition of the present disclosure may be introduced into a portion of a formation where it may be allowed to contact at least a portion of the subterranean formation and at least partially dissolve siliceous materials therein so as to create one or more voids in the subterranean formation. Introduction of the composition may, in certain embodiments, be carried out at or above a pressure sufficient to create or enhance one or more fractures within the subterranean formation. In other embodiments, introduction of the composition may be carried out at a pressure below that which would create or enhance one or more fractures within the subterranean formation. These methods and/or compositions of the present disclosure may be used in conjunction with other stimulation treatments as well, including but not limited to fracturing treatments, acidizing treatments, hydrajetting treatments, frac-acidizing treatments, and the like.

In another example, the methods and/or compositions of the present disclosure may be used in a treatment of a well bore just prior to placing cement and/or casing in the well bore, among other reasons, in order to remove filter cakes comprising siliceous materials from the well bore. In these embodiments, a composition of the present disclosure may be continuously pumped down the casing or pipe and upwardly through an annulus in the well bore in contact with the filter cake as a pre-flush just prior to introducing a spacer fluid and a cement slurry into the annulus. In certain of these embodiments, the quantity of the composition of the present disclosure pumped through the annulus prior to when the cement slurry is introduced therein (as well as other compositions used to dissolve non-siliceous components of the filter cake) may be a predetermined quantity calculated to remove substantially all of the filter cake, which may provide for a more successful and efficient cementing job.

Other suitable subterranean operations in which the methods and/or compositions of the present disclosure may be used include, but are not limited to, pre-flush treatments, after-flush treatments, hydraulic fracturing treatments, sand control treatments (e.g., gravel packing), "frac-pack" treatments, well bore clean-out treatments, and other operations where a treatment fluid may be useful. In certain embodiments, the methods and compositions of the present invention also may be used in cleaning operations or treatments conducted at the surface that are used to clean or prepare equipment or other components that are subsequently used in subterranean operations. For example, a method or composition of the present disclosure may be used to pre-treat sand, proppant, or gravel particulates by removing siliceous materials on their surfaces prior to coating the sand or particulates with a resin, tackifying agent, or other substance and/or placing them in a portion of a subterranean formation or well bore. These pre-treatments may be performed, among other reasons, to prevent siliceous materials on the proppant or gravel from interfering with a coating process, reduce diagenesis, and/or minimize residues, sediment, and/or other substances that siliceous materials may produce in a subterranean sand, proppant, or gravel pack.

The composition of the present disclosure may be introduced or injected into the well bore using any method or equipment known in the art. In certain embodiments, a composition of the present disclosure may be circulated in the well bore using the same types of pumping systems and equipment that are used to introduce drilling fluids, acidizing fluids, cementing fluids, and/or other treatment fluids into a subterranean formation. In certain embodiments, a composition of the present disclosure may be introduced into the formation using coiled tubing or other similar apparatus used for spot treatments, among other reasons, to contact siliceous materials in a targeted area of a subterranean formation or well bore. In certain embodiments, a composition of the present disclosure may be introduced into the formation as a pill (e.g., a fluid of relatively small volume), for example, in the course of a drilling process or other subterranean operation and circulated in one or more area of the formation to treat siliceous materials therein.

Figure 1:
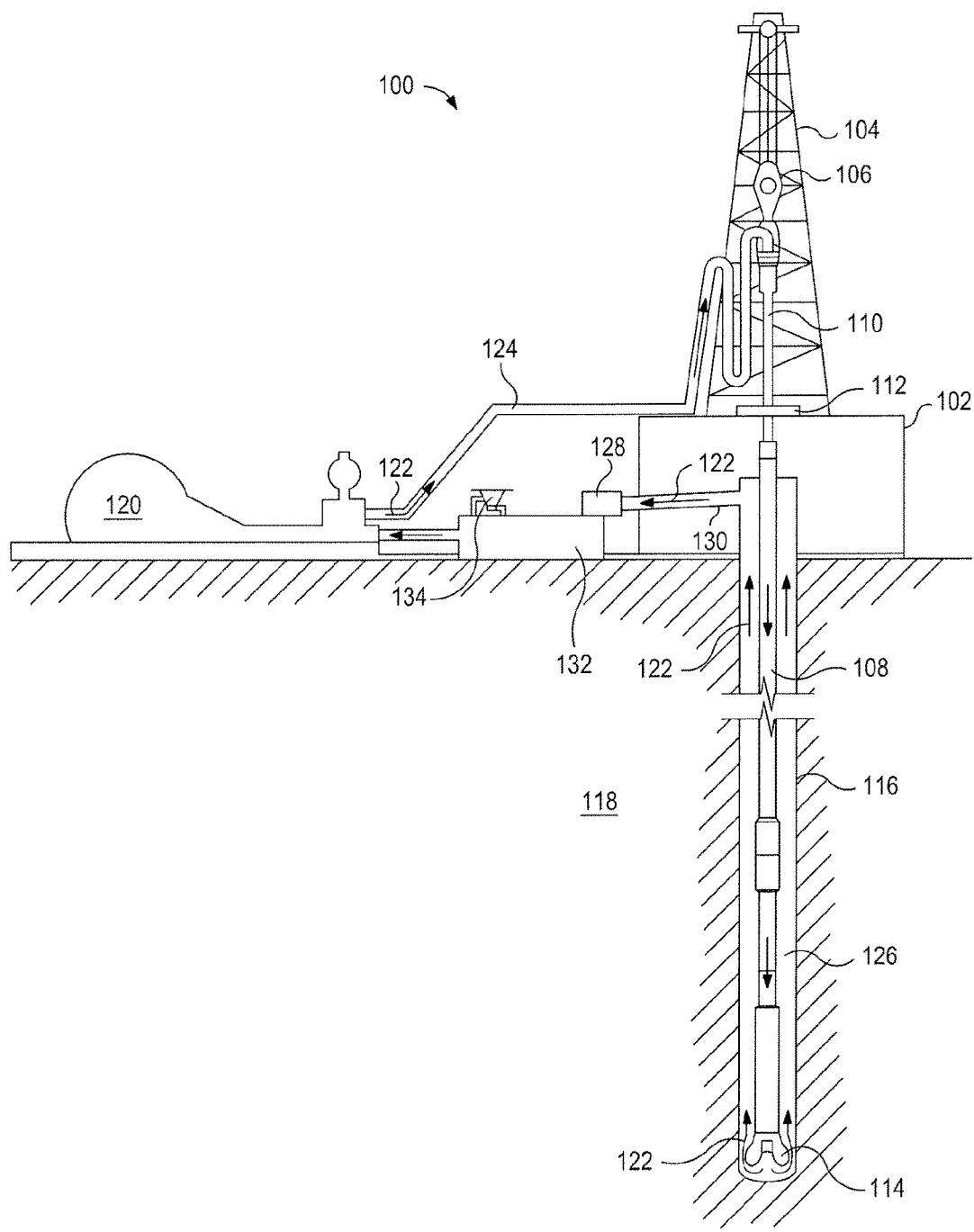
FIG. 1 is a diagram illustrating an example of a well bore drilling assembly that may be used in accordance with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed methods and compositions may directly or indirectly affect the pump 120, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like. The disclosed fluids and additives may also directly or indirectly affect the mixing hopper 134 and the retention pit 132 and their assorted variations.

The disclosed methods and compositions also may directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed methods and compositions may also directly or indirectly affect any downhole heat exchangers, valves and corresponding actuation devices, tool seals, packers and other wellbore isolation devices or components, and the like associated with the wellbore 116. The disclosed methods and compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed methods and compositions may also directly or indirectly affect any transport or delivery equipment used to convey the compositions to the drilling assembly 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: providing a treatment composition comprising a base fluid, a catechol component, and an amine component; introducing the treatment composition into at least a portion of a subterranean formation comprising one or more siliceous materials; and allowing at least a portion of the treatment composition to contact at least a portion of the siliceous materials in the subterranean formation to dissolve at least a portion of the siliceous materials.

Another embodiment of the present disclosure is a method comprising: providing a treatment composition comprising a base fluid, a catechol component, and an amine component; introducing the treatment composition into at least a portion of a subterranean formation comprising one or more siliceous materials; and allowing at least a portion of the treatment composition to dissolve at least a portion of the siliceous materials to form at least one void in the subterranean formation.

Another embodiment of the present disclosure is a method comprising: providing a treatment composition comprising a base fluid, a catechol component, and an amine component; providing a plurality of particulates comprising one or more siliceous materials; and allowing at least a portion of the treatment composition to contact at least a portion of the siliceous materials to dissolve at least a portion of the siliceous materials.

Another embodiment of the present disclosure is a subterranean treatment composition comprising: a base fluid; a catechol component, and an amine component.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment composition comprising a base fluid, a catechol component, and at least one of an amine component and ammonia, wherein the molar ratio of the amount of the at least one of the amine component and ammonia to the amount of the catechol component is from about 3:1 to about 15:1, and wherein the amount of the at least one of the amine component and ammonia increases the pH of the treatment composition to greater than 8;
introducing the treatment composition into at least a portion of a subterranean formation comprising one or more siliceous materials; and
allowing at least a portion of the treatment composition to contact at least a portion of the one or more siliceous materials in the subterranean formation to dissolve at least a portion of the one or more siliceous materials.

2. The method of claim 1 wherein the treatment composition comprises ammonia.

3. The method of claim 1 wherein the treatment composition comprises the amine component, and wherein the amine component comprises at least one compound selected from the group consisting of: a primary amine, a secondary amine, a tertiary amine, a polyamine, an amine hydroxide, ethylene diamine, ethanolamine, guanidine, any derivative thereof, and any combination thereof.

4. The method of claim 1 wherein the catechol component comprises at least one compound selected from the group consisting of: catechol, catechin, hydroxyquinol, pyrogallol, 1,2,3,5-tetrahydroxybenzene, benzenehexol, a catecholamine, humic acid, any derivative thereof, and any combination thereof.

5. The method of claim 1 wherein the treatment composition does not comprise fluorides.

6. The method of claim 1 wherein the one or more siliceous materials are present in a filter cake in a well bore penetrating at least a portion of the subterranean formation.

7. The method of claim 6 further comprising removing at least a portion of the filter cake from the well bore.

8. The method of claim 1 wherein the step of introducing the treatment composition into at least a portion of the subterranean formation comprises introducing a pill comprising the treatment composition into at least a portion of the subterranean formation.

9. The method of claim 1 wherein the treatment composition is introduced into at least a portion of the subterranean formation after at least a portion of a subterranean drilling operation.

10. The method of claim 1 wherein the molar ratio of the amount of the catechol component to the amount of silicon in an area of the subterranean formation being treated is from about 2:1 to about 10:1, wherein the area of the subterranean formation being treated comprises a filter cake.

11. The method of claim 1 further comprising mixing the catechol component and at least one of the amine component and ammonia with the base fluid to form the treatment composition using mixing equipment communicably coupled to a retention pit containing the base fluid.

12. The method of claim 1 wherein the treatment composition is introduced into at least a portion of the subterranean formation using one or more pumps.

13. The method comprising of claim 1, wherein dissolving at least a portion of the one or more siliceous materials forms at least one void in the subterranean formation.

14. The method of claim 13 wherein the treatment composition comprises one or more acids.

15. A method comprising:
providing a treatment composition comprising a base fluid, a catechol component, and at least one of an amine component and ammonia, wherein the molar ratio of the amount of the at least one of the amine component and ammonia to the amount of the catechol component is from about 3:1 to about 15:1, and wherein the amount of the at least one of the amine component and ammonia increases the pH of the treatment composition to greater than 8;
providing a plurality of particulates in at least a portion of a subterranean formation, wherein each of the plurality of particulates comprises one or more siliceous materials; and
allowing at least a portion of the treatment composition to contact at least a portion of the one or more siliceous materials in the at least a portion of a subterranean formation to dissolve at least a portion of the siliceous materials.

16. The method of claim 15 further comprising coating at least a portion of the plurality of particulates with a resin or tackifying agent.

17. The method of claim 15 wherein the particulates comprise one or more particulates selected from the group consisting of: sand, a proppant particulate, a gravel particulate, and any combination thereof.

* * * * *